US006909043B1

(12) United States Patent
Kim et al.

(10) Patent No.: US 6,909,043 B1
(45) Date of Patent: Jun. 21, 2005

(54) EMI SEAL FOR SYSTEM CHASSIS

(75) Inventors: David K. Kim, San Jose, CA (US); William W. Ruckman, San Jose, CA (US); Wenjun Chen, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/706,203

(22) Filed: Nov. 12, 2003

(51) Int. Cl.[7] .................................................. H05K 9/00
(52) U.S. Cl. ................................. 174/35 GC; 361/685
(58) Field of Search ....................... 174/35 R, 35 GC; 361/816, 818, 683, 685

(56) References Cited

U.S. PATENT DOCUMENTS

| | | | |
|---|---|---|---|
| 5,142,447 A | * | 8/1992 | Cooke et al. ............... 361/685 |
| 5,166,772 A | | 11/1992 | Soldner et al. |
| 5,180,905 A | | 1/1993 | Chen et al. |
| 5,256,867 A | | 10/1993 | Cheng |
| 5,262,737 A | * | 11/1993 | Siverling ..................... 333/12 |
| 5,294,826 A | | 3/1994 | Marcantonio et al. |
| 5,357,404 A | | 10/1994 | Bright et al. |
| 5,561,265 A | | 10/1996 | Livshits et al. |
| 5,566,052 A | | 10/1996 | Hughes |
| 5,586,011 A | | 12/1996 | Alexander |
| 5,639,989 A | | 6/1997 | Higgins, III |
| 5,748,455 A | | 5/1998 | Phillips et al. |
| 5,777,854 A | * | 7/1998 | Welch et al. ............... 361/800 |
| 5,808,237 A | * | 9/1998 | Hancock .................. 174/35 R |
| 5,825,634 A | | 10/1998 | Moorehead, Jr. |
| 6,057,600 A | | 5/2000 | Kitazaw et al. |
| 6,063,999 A | | 5/2000 | Kelly |
| 6,088,231 A | | 7/2000 | Fajardo |
| 6,137,051 A | | 10/2000 | Bundza |
| 6,140,577 A | | 10/2000 | Rapaich et al. |
| 6,198,630 B1 | | 3/2001 | Cromwell |
| 6,219,239 B1 | | 4/2001 | Mellberg et al. |
| 6,219,254 B1 | | 4/2001 | Akerling et al. |
| 6,239,359 B1 | | 5/2001 | Lilienthal, II et al. |
| 6,252,313 B1 | | 6/2001 | Zhang et al. |
| 6,259,609 B1 | | 7/2001 | Kurz |
| 6,269,863 B1 | | 8/2001 | Wyler |
| 6,278,617 B1 | | 8/2001 | Yang et al. |
| 6,285,548 B1 | * | 9/2001 | Hamlet et al. ............... 361/695 |
| 6,288,330 B1 | | 9/2001 | Chen |
| 6,288,336 B1 | * | 9/2001 | Chen ........................... 174/66 |

(Continued)

FOREIGN PATENT DOCUMENTS

WO   WO 03/041466   5/2003

OTHER PUBLICATIONS

Radu, et al., "Investigation of Internal Partitioning in Metallic Enclsosures for EMI Control," Sun Microsystems, Inc, et al., Jun. 1997, pp. 171–176.

(Continued)

*Primary Examiner*—Hung V. Ngo
(74) *Attorney, Agent, or Firm*—Robert C. Kowert; Meyertons, Hood, Kivlin, Kowert & Goetzel, P.C.; Erik A. Heter

(57) ABSTRACT

A method and apparatus for providing an EMI seal in a system chassis. The EMI seal is provided by a bezel assembly for a storage medium drive. The bezel assembly includes a front bezel having an aperture through which a tray can extend for loading and unloading of the storage medium drive, and a tray bezel attached to the tray. Attached to the front bezel is an electrically conductive link. Both the front bezel and the tray bezel include an electrically conductive inner surface. Upon closing the tray, the electrically conductive link provides an electrical connection between the inner surface front bezel and the inner surface of the tray bezel.

26 Claims, 3 Drawing Sheets

U.S. PATENT DOCUMENTS

| | | |
|---|---|---|
| 6,294,407 B1 | 9/2001 | Jacobs |
| 6,297,551 B1 | 10/2001 | Dudderar et al. |
| 6,320,257 B1 | 11/2001 | Jayaraj et al. |
| 6,327,074 B1 | 11/2001 | Lunden |
| 6,339,253 B1 | 1/2002 | Corisis |
| 6,362,977 B1 | 3/2002 | Tucker et al. |
| 6,400,164 B1 | 6/2002 | Sampath |
| 6,426,882 B1 * | 7/2002 | Sample .................. 361/818 |
| 6,483,406 B1 | 11/2002 | Sawa et al. |
| 6,525,407 B1 | 2/2003 | Drewery |
| 6,573,590 B1 | 6/2003 | Radu et al. |
| 6,597,575 B1 | 7/2003 | Matayabes et al. |
| 6,683,796 B2 | 1/2004 | Radu et al. |
| 6,703,704 B1 | 3/2004 | Alcoe et al. |
| 6,713,672 B1 * | 3/2004 | Stickney ............... 174/35 GC |
| 6,723,915 B2 | 4/2004 | Radu et al. |

OTHER PUBLICATIONS

Article: "Identifying an EMI Source and Coupling Path in a Computer System with Sub–Module Testing"; Radu, et al.; Electromagnetic Compatibility Laboratory, Dept. of Electrical Engineering, University of Missouri–Rolla, Rolla, MO and Electromagnetic Compatibility Group, Sun Microsystems, Mountain View, CA; pp. 165–170.

Article: "Intel® Pentium® 4 Processor in the 423–Pin Package EMI Guideline"; Oct. 2000; ©Intel Corporation.

Article: "Mechanical Enabling Efforts"; Fall 2000; Intel Developer Forum; ©Intel Corporation.

* cited by examiner

US 6,909,043 B1

EMI SEAL FOR SYSTEM CHASSIS

BACKGROUND OF THE INVENTION

1. Field of the Invention

This invention relates to electromagnetic shielding in electronic systems, and more particularly, the shielding for a chassis in an electronic system.

2. Description of the Related Art

One important aspect in the design of computers and electronic systems is the shielding of electromagnetic energy. In the design of most electronic systems, it is desirable to shield the system from unwanted electromagnetic interference from external sources, as well as to contain electromagnetic energy generated by the system itself. Furthermore, certain government regulations (e.g., Federal Communications Commission requirements) may necessitate that electronic systems be designed to contain electromagnetic noise within certain specifications.

Computers and other electronic systems are typically contained within an enclosure that includes a chassis. Due to the operation of various components in such an electronic system, electromagnetic energy may be coupled to the chassis. This energy may translate into currents that are conducted on the interior of the chassis surface. While the chassis may be designed with a minimal number of slots and/or other apertures to contain internally generated electromagnetic energy from escaping (or externally generated electromagnetic energy from entering), apertures that may be present in the chassis may allow electromagnetic energy to enter or escape. For example, systems having CD/DVD players may allow electromagnetic energy to escape the chassis through a plastic front bezel and/or tray bezel. Furthermore, the open aperture in the chassis may function as antenna for electromagnetic waves of certain frequencies. This may allow electromagnetic interference to affect the operation of the system.

SUMMARY OF THE INVENTION

A method and apparatus for providing an EMI seal in a system chassis are disclosed. In one embodiment, the EMI seal is provided by a bezel assembly for a storage medium drive. The bezel assembly includes a front bezel having an aperture through which a tray can extend for loading and unloading of the storage medium drive, and a tray bezel attached to the tray. Attached to the front bezel is an electrically conductive link. Both the front bezel and the tray bezel include an electrically conductive inner surface. Upon closing the tray, the electrically conductive link provides an electrical connection between the inner surface front bezel and the inner surface of the tray bezel. The front bezel may also be electrically coupled to the system chassis, which may in turn be coupled to an electrical ground.

BRIEF DESCRIPTION OF THE DRAWINGS

Other aspects of the invention will become apparent upon reading the following detailed description and upon reference to the accompanying drawings in which.

Figure 1:
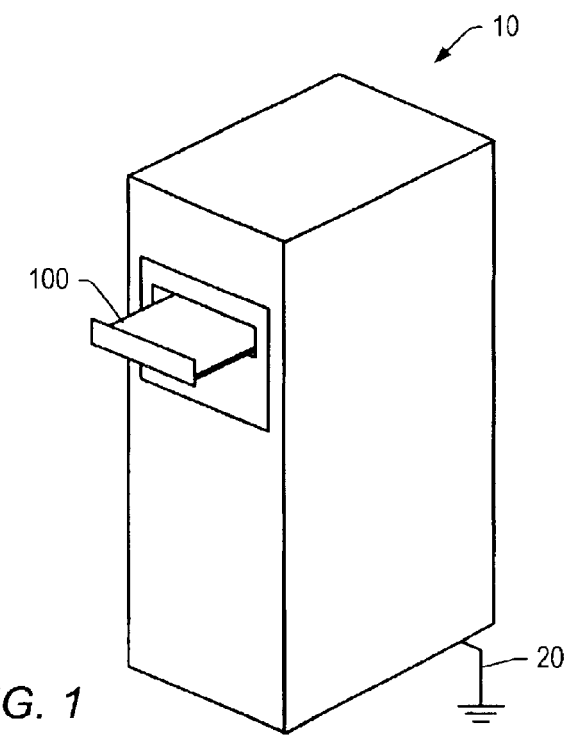
FIG. 1 is a drawing of an exemplary embodiment of a system chassis with a storage medium drive in which the EMI seal may be implemented.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Turning now to FIG. 1, a drawing of an exemplary embodiment of a system chassis with a storage medium drive is shown. System chassis 10 is an example of a chassis that may be used in a computer system (although similar chassis may be used for other types of electronic systems as well as computers). A plastic enclosure (not shown) may house system chassis 20.

In the embodiment shown, system chassis 10 may be constructed of an electrically conductive material. An electrical ground 20 is coupled to system chassis 10. The electrical ground may be provided using various means, such as coupling to the ground of a power supply within the computer system, which may in turn be grounded via a power cord.

As previously noted, system chassis 10 may be comprised of an electrically conductive material (e.g. metal). Although system chassis 10 may be substantially continuous, the chassis may include some apertures, such as an aperture for storage medium drive 100. Similar to system chassis 10, storage medium drive 100 may include its own chassis, which may be constructed of an electrically conductive material. Furthermore, storage medium drive 100 includes a front bezel, and in some embodiments may include a tray bezel. Both the front bezel and the tray bezel (which will be discussed in greater detail below) include electrically conductive surfaces for the purpose of maintaining a seal for electromagnetic energy that may pass between the inner portion of the computer system and its surroundings.

Storage medium drive 100 may be one of several different types of drives. In one embodiment, storage medium drive 100 may be configured for playing compact disks (CD's) and/or digital video disks (DVD's). In other embodiments, storage medium drive 100 may be a disk drive configured to receive a storage disk (e.g., a floppy disk) or a tape drive. Embodiments of storage medium drive 100 configured for disk or tape storage may include a door in lieu of a tray bezel, wherein the door may have at least one electrically conductive surface.

Figure 2:
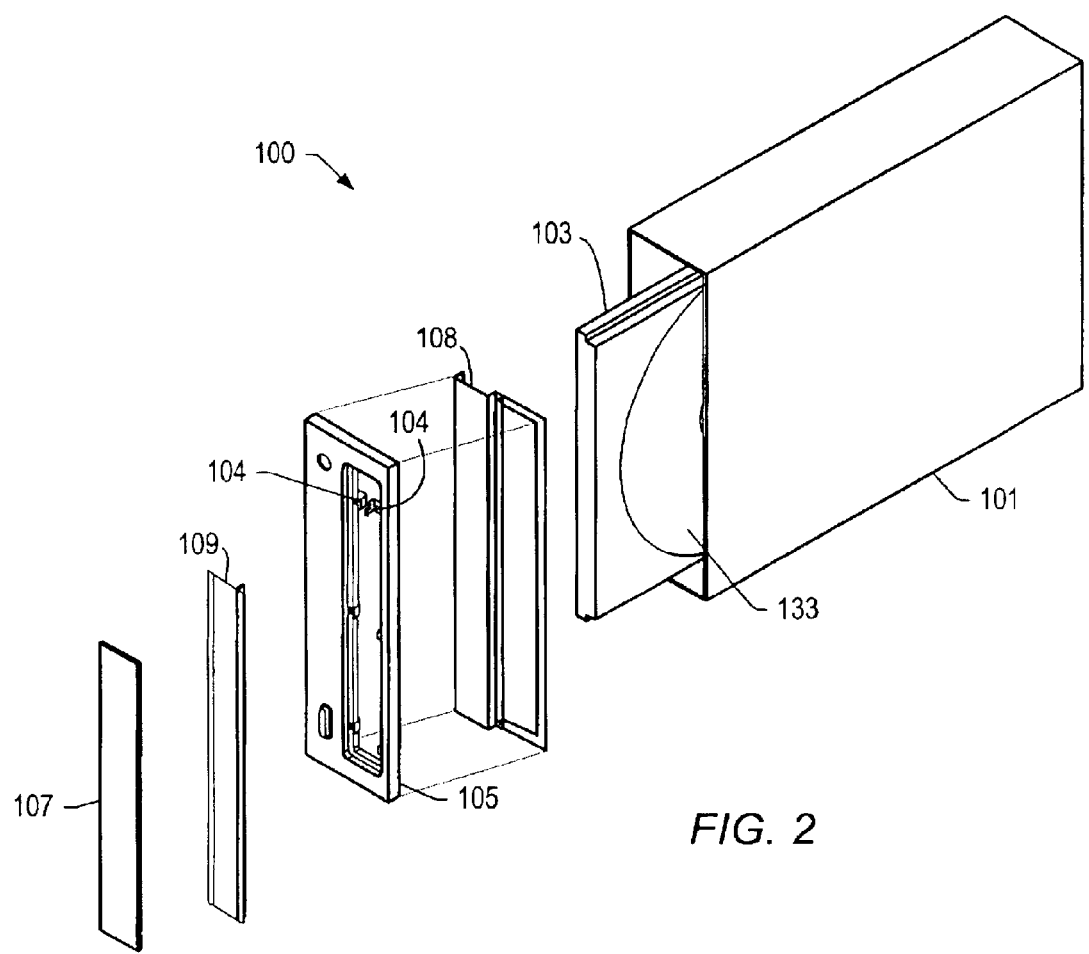
FIG. 2 is a drawing of one embodiment of a storage medium drive.

Moving now to FIG. 2, a drawing of one embodiment of a storage medium drive is shown. In the embodiment shown, storage medium drive 100 is a drive configured for receiving compact disks (CD's) or digital video disks (DVD's). Other embodiments, such as disk drives and tape drives are also possible and contemplated. Storage medium drive 100 includes an enclosure 101, from which tray 103 may extend for loading a CD/DVD 133. When the CD/DVD 133 is loaded, tray 101 may return to a closed position in which it is recessed within enclosure 101. Enclosure 101 may be constructed, at least in part, of an electrically conductive material, and may further be configured for electrical coupling to a system chassis such as the one discussed above in reference to FIG. 1.

Storage medium drive 100 includes a front bezel 105, the front bezel having at least one electrically conductive surface. In the embodiment shown, front bezel 105 has an electrically conductive inner surface 108, which conforms to the contours of the front bezel. Embodiments are possible and contemplated wherein the outer surface of front bezel 105 includes an electrically conductive surface, as well as embodiments wherein front bezel 105 is electrically conductive along the entirety of its surface area. Front bezel 105 also includes an aperture which allows for the opening and closing motion of tray 103.

Tray bezel 107 is configured to be coupled to tray 103. Similar to front bezel 105, tray bezel 107 includes at least one electrically conductive surface. In this particular embodiment, tray bezel 107 includes electrically conductive inner surface 109. As with front bezel 105, embodiments are possible and contemplated wherein the outer surface is electrically conductive, as well as embodiments wherein the entirety of the surface area of tray bezel 107 is electrically conductive.

Various materials or structures may be used to implement the electrically conductive surfaces for front bezel 105 and tray bezel 107. These materials or structures may include a spray-on electrically conductive material, and adhesive material (wherein the side opposite of the adhesive is electrically conductive), or a separate piece of electrically conductive material (e.g. metal) configured to be attached to its respective bezel. The details of various embodiments of the electrically conductive surfaces of front bezel 105 and tray bezel 107 will be discussed in further detail in below in reference to FIG. 5.

At least one electrically conductive link 104 is attached to front bezel 105. In the embodiment shown, the electrically conductive link is provided by electrically conductive clips. Each of the electrically conductive clips may be constructed of a metallic material. When tray 103 is in the closed position, the electrically conductive clips provide an electrical connection between the electrically conductive surface 109 of tray bezel 107 and the electrically conductive surface 108 of front bezel 105. Thus, when tray 103 is in the closed position, the combination of the electrically conductive surfaces of front bezel 105, tray bezel 107, and conductive link(s) 104 provide a seal that blocks electromagnetic energy from entering or exiting system chassis 20 through tray bezel 107 or front bezel 105. Since front bezel is electrically coupled to an electrical ground though system chassis 20, any electrical currents generated on the electrically conductive surfaces of front bezel 105 and tray bezel 107 will be drained to the electrical ground.

Other embodiments are possible and contemplated for the electrically conductive link(s). For example, embodiments are possible and contemplated wherein an adhesive material (such as a conductive tape) with an electrically conductive side are attached in the areas defining the opening in front bezel 105. In another embodiment, electrically conductive links may be integrated into the construction of front bezel 105 or conductive surface 108. An electrically conductive hinge may be implemented in embodiments in which the storage medium drive 100 includes a door instead of a tray bezel. Such embodiments include (but are not limited to) disk drives and tape drives.

Figure 3:
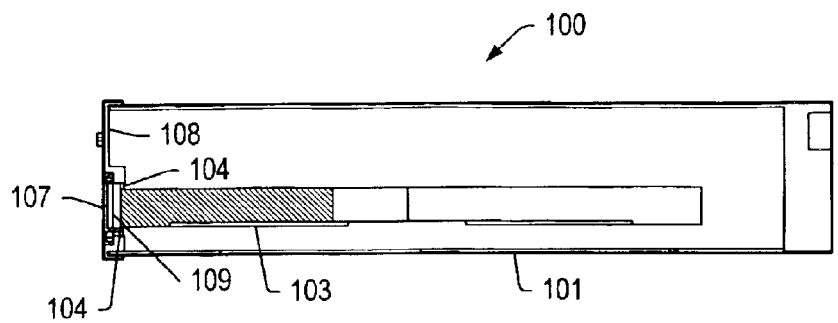
FIG. 3 is a side view of one embodiment of a storage medium drive.

FIG. 3 is a side view of one embodiment of a storage medium drive. In the embodiment shown, tray 103 of storage medium drive 100 is in the closed position. When tray 103 is in the closed position, electrically conductive surface 109 of tray bezel 107 is electrically coupled to electrically conductive surface 108 of front bezel 105 through conductive link(s) 104. Conductive link 104 provides a conductive path between electrically conductive surfaces 109 and 108 of tray bezel 107 and front bezel 105, respectively. Furthermore, enclosure 101 may include at least one electrically conductive surface which is electrically coupled to the electrically conductive surface 108 of front bezel 105. Thus, the electrically conductive surface 109 of tray bezel 107 is electrically coupled to enclosure 10, and thus to system ground.

In some embodiments, enclosure 101 may be constructed substantially or in its entirety of an electrically conductive material. In such embodiments, storage medium drive 100 is effectively sealed from electromagnetic energy. That is, the assembly shown may substantially prevent any externally generated electromagnetic energy from entering into the internal portion of storage medium drive 100. Similarly, the assembly may substantially prevent any internally generated electromagnetic energy from escaping storage medium drive 100.

Figure 4:
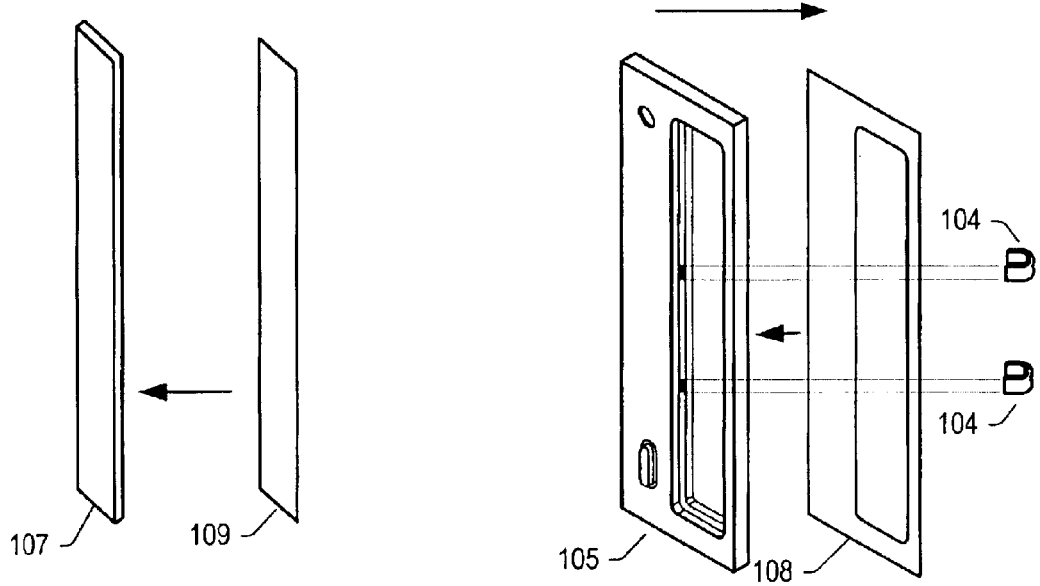
FIG. 4 is a drawing of a front bezel, a tray bezel, and a conductive link for one embodiment of a storage medium drive.

FIG. 4 is a drawing of a front bezel, a tray bezel, and a conductive link for one embodiment of a storage medium drive. In the embodiment shown, electrically conductive surface 108 is applied to front bezel 105. Also applied to front bezel 105 are conductive links 104. The conductive links may be the electrically conductive clips discussed above for one embodiment. The conductive links may also be implemented using other materials or structures as well, such as the use of an adhesive material wherein the side opposite the adhesive side is electrically conductive.

In the embodiment shown, front bezel 105 includes a recess having notches in which a portion of the conductive clips may be placed. The conductive clips may be placed in the notches of front bezel 105 such that they wrap around through the edge of the opening and contact electrically conductive surface 108. In addition to the conductive clips shown in this particular diagram (in the bottom portion of the aperture of front bezel 105), additional conductive links 104 may be attached to front bezel 105 in the top or side portions of the aperture.

Another electrically conductive surface 109 is applied to tray bezel 107. Thus, when the tray to which tray bezel is in the closed position, the electrically conductive surfaces 108 and 109, combined with conductive links 104 provide a continuous or near-continuous electrically conductive surface which may effectively close the aperture in a system chassis to the transfer of electromagnetic energy. In particular, when tray 103 is in the closed position, tray bezel 107 (and thus electrically conductive surface 109) are positioned within the confines of the recessed portion of the opening of front bezel 105. Thus, electrically conductive surface 109 will be in physical contact with the conductive clips used to implement conductive links 104 in this embodiment.

Figure 5:
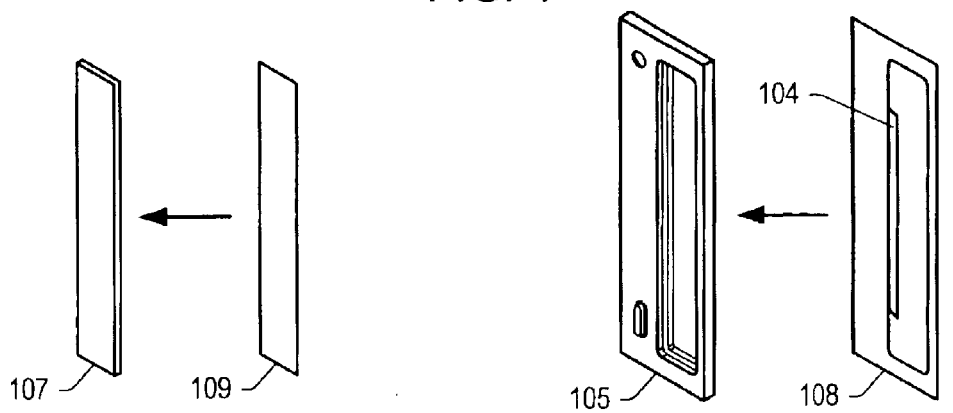
FIG. 5 is a drawing of a front bezel, a tray bezel, and a conductive link for another embodiment of a storage medium drive.

FIG. 5 is a drawing of a front bezel, a tray bezel, and a conductive link for another embodiment of a storage medium drive. In the embodiment shown, conductive link 104 is an integral portion of electrically conductive surface 108. When electrically conductive surface 108 is coupled to front bezel 105, conductive link 104 may be formed such that it will be in contact with electrically conductive surface 109 when tray 103 is in the closed position. For example, conductive link 104 may, in one embodiment, be a flexible tab of metal that may be wrapped around the recessed portion of the opening such that it, comes into contact with electrically conductive surface 109 when tray 103 is closed. Conductive link 104 may also be an integral part of front bezel 105, and may be positioned within the recessed portion of front bezel 105.

Conductive link 104 may also be implemented as a section of electrically conductive adhesive material attached to electrically conductive surface 108, ensuring that a portion of the adhesive material's electrically conductive side is in electrical contact with electrically conductive surface 108. In such adhesive embodiments, conductive link 104 may also be attached to front bezel 105. For example, conductive link 104 may be a portion of electrically conductive adhesive material, and may be attached to front bezel 105 prior to attaching electrically conductive surface 108.

As previously noted, the embodiments described herein may also include storage medium drives, such as disk drives that include a door instead of a tray bezel. The electrically conductive links may include electrically conductive hinges that connect the door to the tray bezel, although the other types of conductive links described herein may also be used.

Figure 6:
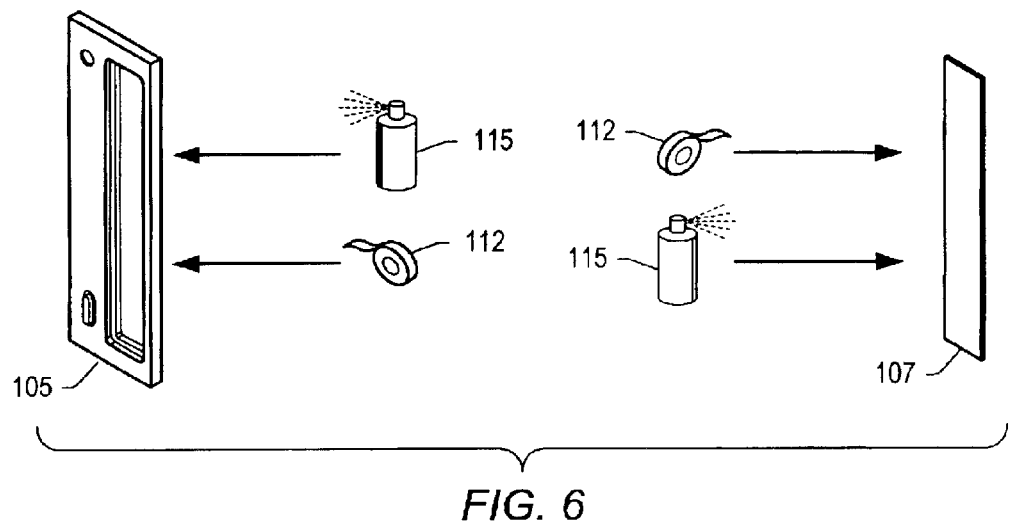
FIG. 6 is a drawing of a front bezel and a tray bezel for one embodiment of a storage medium drive illustrating various methods of applying an electrically conductive surface.

Turning finally to FIG. 6, a drawing of a front bezel and a tray bezel for one embodiment of a storage medium drive illustrating various methods of applying an electrically conductive surface is shown. In one embodiment, an electrically conductive surface may be applied to each of front bezel 105 and tray bezel 107 by a sprayer 112. Sprayers 112 may apply a material that, when dry, forms an electrically conductive surface on the front bezel 105 and/or tray bezel 107. Sprayer 112 may be a simple spray can (e.g., an aerosol spray can) or may be an industrial grade spraying system suitable for high volume manufacturing.

In another embodiment, the electrically conductive surfaces of front bezel 105 and tray bezel 107 may be applied using adhesive material 115, which includes an adhesive side and an electrically conductive side. In one embodiment, adhesive material 115 may be an electrically conductive tape on a tape roll, and may be manually applied to each of the front bezel 105 and tape bezel 107. In another embodiment, adhesive material 115 may be adhesives that are pre-formed to conform to the outline of front bezel 105 and tray bezel 107. Adhesive material may also be used to form the conductive links 104 that electrically couple tray bezel 107 to front bezel 105 when the tray is in the closed position (or couple the door to the front bezel in storage medium drive embodiments that include a door in lieu of a tray bezel). Although not explicitly shown here, other embodiments are possible and contemplated wherein the electrically conductive surfaces are preformed pieces of electrically conductive material, such as pre-formed pieces of metal that conform to the dimensions and contours of the front bezel and tray bezel, respectively.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A bezel assembly for a storage medium drive, the bezel assembly comprising:
   a front bezel having an aperture through which a tray can extend for loading or unloading of the storage medium drive;
   an electrically conductive link attached to the front bezel; and
   a tray bezel attached to the tray;
   wherein the front bezel and the tray bezel each have an inner surface comprised of an electrically conductive material, and wherein, when the tray is in a closed position, the electrically conductive link electrically couples the inner surface of the front bezel to the inner surface of the tray bezel.

2. The assembly as recited in claim 1, wherein the electrically conductive material is a metallic coating.

3. The assembly as recited in claim 2, wherein the metallic coating is applied to the inner surface of the front bezel and the inner surface of the tray bezel by spraying.

4. The assembly as recited in claim 2, wherein the metallic coating is applied to the inner surface of the front bezel and the inner surface of the tray bezel with a brush.

5. The assembly as recited in claim 1, wherein the electrically conductive material of each of the inner surface of the front bezel and the inner surface of the tray bezel is a separate piece of metal.

6. The assembly as recited in claim 1, wherein the inner surface of each of the front bezel and the tray bezel comprises an adhesive material having an electrically conductive side and an adhesive side in contact with at least one of the front bezel or the tray bezel.

7. The assembly as recited in claim 1, wherein the inner surface of the front bezel is electrically coupled to a chassis of an electronic system.

8. The assembly as recited in claim 7, wherein the chassis of the electronic system is electrically coupled to an electrical ground.

9. The assembly as recited in claim 1, wherein the electrically conductive link comprises a conductive clip attached to the front bezel.

10. The assembly as recited in claim 9, wherein a plurality of conducive clips are attached to the front bezel.

11. The assembly as recited in claim 1, wherein the electrically conductive link comprises an adhesive material having an adhesive side and an electrically conductive side.

12. The assembly as recited in claim 1, wherein the storage medium drive is a compact disk (CD) drive.

13. The assembly as recited in claim 1, wherein the storage medium drive is a digital video disk (DVD) drive.

14. A method for providing a closed loop EMI connection in a storage medium drive, the method comprising:
   providing a front bezel having an aperture through which a tray can extend for loading or unloading of the storage medium drive, the front bezel having a first electrically conductive surface;
   providing an electrically conductive link attached to the front bezel;
   providing a tray bezel attached to the tray, the tray bezel having a second electrically conductive surface; and
   closing the tray, wherein when the tray is in a closed position, the conductive link provides an electrical connection between the first electrically conductive surface and the second electrically conductive surface.

15. The method as recited in claim 14, wherein the electrically conductive material is a metallic coating.

16. The method as recited in claim 15 further comprising applying the metallic coating by spraying.

17. The method as recited in claim 15 further comprising applying the metallic coating with a brush.

18. The method as recited in claim 14 further comprising attaching a first piece of metal to the front bezel to form the first electrically conductive surface and a second piece of metal to the tray bezel to form the second electrically conductive surface.

19. The method as recited in claim 14 further comprising forming the first and second electrically conductive surface by attaching adhesive material to each of the front bezel and tray bezel, respectively, wherein the adhesive material has an adhesive side and an electrically conductive side.

20. The method as recited in claim 14 wherein the first electrically conductive surface of the front bezel is electrically coupled to a chassis of an electronic system.

21. The method as recited in claim 20, wherein the chassis of the electronic system is electrically coupled to an electrical ground.

22. The method as recited in claim 14, wherein the conductive link comprises a conductive clip attached to the front bezel.

23. The method as recited in claim 22, wherein a plurality of conducive clips are attached to the front bezel.

24. The method as recited in claim 14, wherein the electrically conductive link comprises an adhesive material having an adhesive side and an electrically conductive side.

25. The method as recited in claim 14, wherein the storage medium drive is a compact disk (CD) drive.

26. The method as recited in claim 14, wherein the storage medium drive is a digital video disk (DVD) drive.

* * * * *